United States Patent Office 3,337,476
Patented Aug. 22, 1967

3,337,476
CRYSTALLINE POLY(PROPYLENE GLYCOL)
Edwin J. Vandenberg, Wilmington, Del., assignor to Hercules Incorporated, a corporation of Delaware
No Drawing. Filed Mar. 2, 1964, Ser. No. 348,763
2 Claims. (Cl. 260—2)

This application is a continuation-in-part of my copending application Ser. No. 298,434 filed July 29, 1963.

This invention relates to new high molecular weight dihydroxy polyethers and more particularly to crystalline poly(propylene glycol)s.

As is well known, crystalline (isotactic) poly(propylene oxide) can be prepared by polymerizing propylene oxide with catalysts such as the reaction product of ferric chloride and propylene oxide, an aluminum isopropoxide—zinc chloride catalyst, a diethylzinc—water catalyst and the alkylaluminum—water catalysts.

Now in accordance with this invention it has been found that these crystalline poly(propylene oxide)s can be cleaved to produce crystalline polyethers having a terminal hydroxyl group at each end of the polymer chain. These new hydroxyl ended polyethers may be defined as diols of poly(propylene oxide)s wherein each of the hydroxyls is terminal and, accordingly, may be called poly(propylene glycol)s and which have a number average molecular weight of from about 1,000 to about 20,000 and preferably from about 2,000 to about 10,000. These new poly(propylene glycol)s have a high degree of crystallinity as shown by differential thermal analysis.

The poly(propylene oxide) is readily cleaved to the hydroxyl ended diol by reacting the polymer with an organometallic compound of an alkali metal and then treating the cleavage product with aqueous acid to hydrolyze the end groups to hydroxyl groups.

The theory of this invention is illustrated by the following equations for the cleavage of poly(propylene oxide) with an organolithium compound (LiR′), wherein abstraction of hydrogens on a carbon atom beta to the ether linkage leads to cleavage. As will be seen, there are, for any given ether linkage in the polymer chain of poly(propylene oxide), three positions wherein a hydrogen is attached to a carbon beta to the ether linkage, hence there are three possible chain cleavage reactions, two involving cleavage on the left side of the ether linkage and one involving cleavage on the right side of the ether linkage. The following equations illustrate the theory of the cleavage and hydrolysis reactions as they are believed to take place. Equations 1, 2 and 3 illustrate the three cleavage reactions involving the three types of beta hydrogens ($\beta_1$, $\beta_2$ and $\beta_3$). In addition, Equations 4 and 5 illustrate the types of cleavage that can occur when more than one type of beta hydrogen and left and right side cleavage are involved. Obviously, in any one cleavage reaction, there will undoubtedly take place all of these various types of cleavages. Consequently, the end product will be a mixture of these cleavage products. As will be seen from these equations, under some conditions, part of the end groups in the cleavage product contain double bonds, e.g., propenyl in Product A, allyl in Product B and vinyl in Product C. The propenyl and vinyl end groups are readily hydrolyzed by acid washing to hydroxyl end groups as shown in Equations 9 and 10. The allyl end groups isomerize under the influence of the LiR′ or LiOR′ present in the reaction mixture to propenyl end groups which are readily converted to hydroxyl end groups by acid hydrolysis. Under other conditions, e.g., with excess organometallic, the double bond end groups can be further cleaved to convert them directly to LiO—end groups as shown in Equations 6, 7 and 8, which are readily converted to hydroxyl end groups by water washing as shown in Equation 11. Thus in some cases, the direct reaction product of the cleavage contains alkali metal alkoxide end groups which are useful as such, without being hydrolyzed, for carrying out further reactions.

Left Side Cleavage

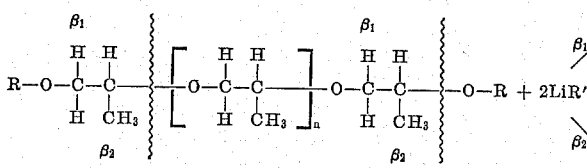

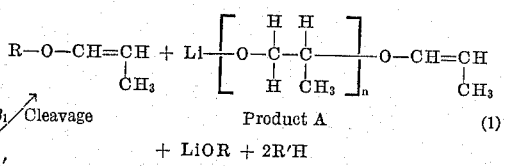

(1)

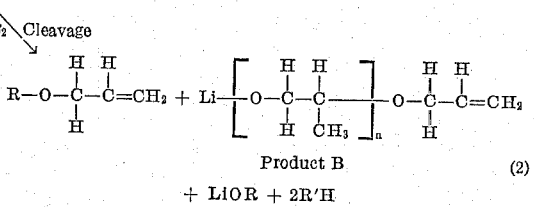

(2)

Right Side Cleavage

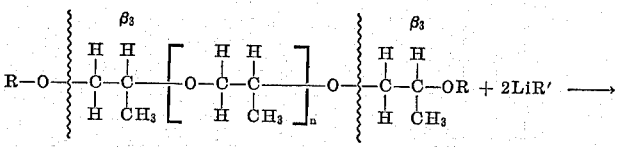

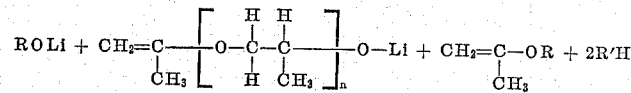

Product C (3)

Left Side and Right Side Cleavage Involving $\beta_1$ and $\beta_3$ Hydrogens

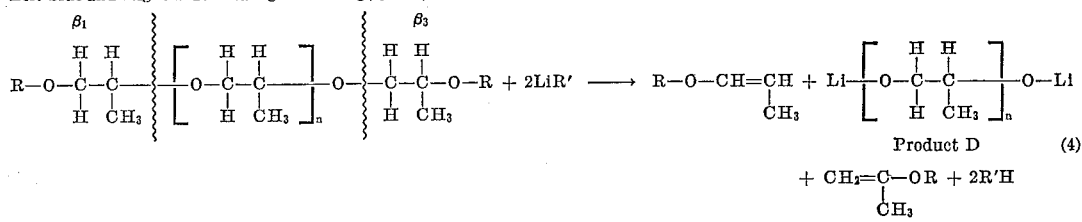

Product D (4)

Left Side and Right Side Cleavage Involving $\beta_2$ and $\beta_3$ Hydrogens

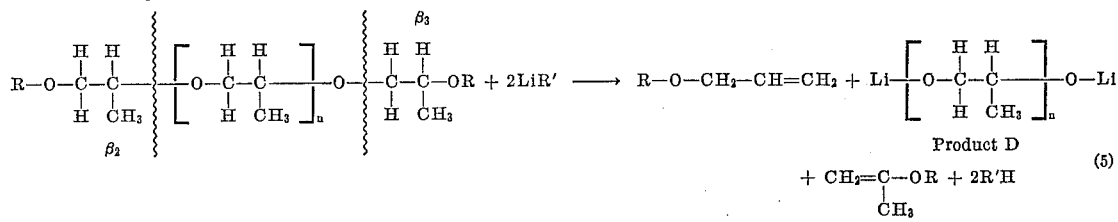

Product D (5)

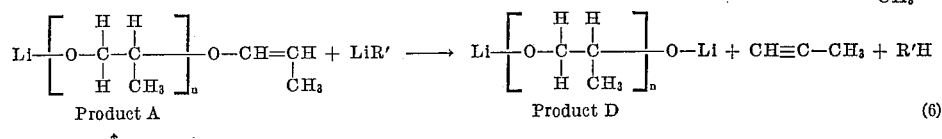

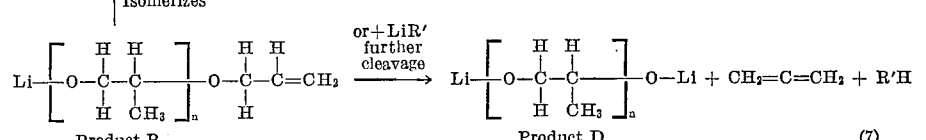

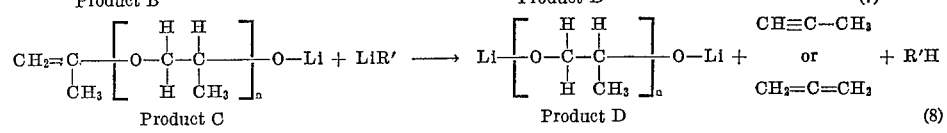

Hydrolysis of Product A

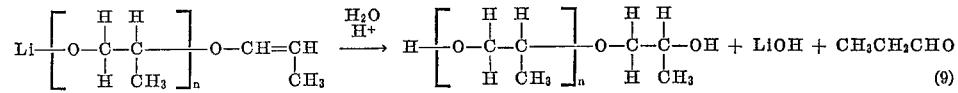

Hydrolysis of Product C

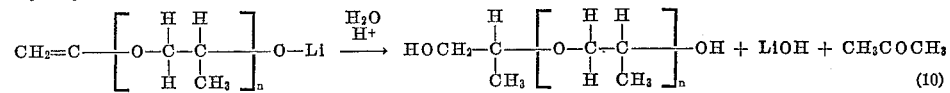

Hydrolysis of Product D

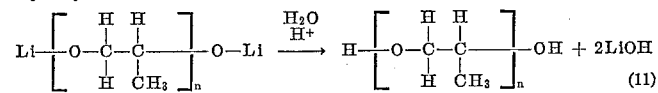

The cleavage reaction is carried out by reacting the poly(propylene oxide) with an organometallic compound of an alkali metal. Any organometallic compound of an alkali metal, i.e., lithium, sodium, potassium, rubidium, or cesium, can be used. The organo moiety will preferably be a hydrocarbon group as, for example, an alkyl, aryl, alkenyl, alkynyl, cycloalkyl, cycloalkenyl, or aralkyl, etc., group. Exemplary of the alkali metal organometallic compounds that can be used are methyllithium, ethyllithium, isopropyllithium, n-butyllithium, isobutyllithium, tert-butyllithium, amyllithium, decyllithium, octadecyllithium, cyclohexyllithium, cyclohexenyllithium, phenyllithium, naphthyllithium, vinyl lithium, lithium acetylide, methylsodium, ethyl sodium, propylsodium, isopropylsodium, the butyl sodiums, amylsodium, dodecylsodium, benzylsodium, isopropenylsodium, allylsodium, octadecenylsodium, butadienylsodium, isoprenylsodium, butylrubidium, butylcesium, methyl-, ethyl-, propyl- and butylpotassium, allylpotassium, octylpotassium, phenylpotassium, cyclopentylpotassium, cyclohexenylpotassium, etc. The amount of the organometallic compound used will depend upon the amount of cleavage desired, at least one molecule of the organometallic being required for each cleavage, i.e., per two chain ends, and as shown in the foregoing reactions may use as much as two moles per cleavage. Thus, the amount of organometallic compound can vary from about 1% up to a large excess, as for example, 5 to 10 times the weight of the polymer being cleaved, but preferably will vary from about 1% to about 100% by weight of the polymer being cleaved.

The cleavage process can be carried out in the absence of a diluent, i.e., a bulk process, but preferably is carried out in a diluent which may be a solvent for the polymer being cleaved or which may serve only as a dispersant for the polymer. Any organic liquid diluent that is inert under the reaction conditions can be used as, for example, aromatic hydrocarbons such as benzene, toluene, xylene, etc., aliphatic and cycloaliphatic hydrocarbons such as hexane, n-heptane, cyclohexane, etc., and mixtures of such hydrocarbons as, for example, petroleum ether, gasoline, etc. Diluents that are capable of reaction with the organometallic compound as, for example, ethers, can also be used provided that the rate of reaction of the organometallic with the polymer being cleaved exceeds the rate of reaction with the diluent. The concentration of the polymer in the diluent can vary from a fraction of 1% up to an essentially diluent-free system. As already mentioned, the polymer can be dissolved in the diluent or a slurry of the polymer in a diluent can be used. Generally, it is preferred to use conditions such that the polymer solution or dispersion is stirrable. Usually the polymer concentration will be in the 2 to 50% range. As noted above, the process can be operated in the absence of a diluent, particularly in the case of polymers which on cleavage become more and more fluid, or by carrying out the process in an extruder after which the cleaved fluid product can be handled in more conventional equipment in a continuous process.

The cleavage reaction can be carried out over a wide temperature range, generally from about −50° C. to about 200° C. depending on the organometallic compound, the stability of the organometallic compound, etc. Preferably, the reaction is carried out at a temperature of from about −20° C. to about 150° C. and more preferably from about 0° C. to about 125° C. The pressure can be atmospheric, subatmospheric or above atmospheric, if desired. In fact, pressures up to several thousand pounds can be used if needed to keep the diluent in the liquid state.

To produce the poly(propylene glycol)s of this invention, the reaction product from the above cleavage reaction must be treated to remove the alkali metal ions. This can be easily accomplished by simply washing the reaction mixture with water (basic, neutral or acidic) or with a weak acid solution (aqueous or non-aqueous), as for example, dilute hydrochloric acid, formic acid, acetic acid, oxalic acid, sulfuric acid, sulfurous acid, nitric acid, sulfonic acid, carbonic acid, etc. With the aqueous acid treatment, any propenyl, vinyl, etc., end groups are hydrolyzed to the corresponding hydroxyl end group.

The poly(propylene glycol)s can be prepared in a wide variety of molecular weights depending on the molecular weight of the starting polymer and the amount of cleavage to which it is subjected. Preferably the polymer that is cleaved will be one of fairly high molecular weight so that the original end groups in the polymer being cleaved are an insignificant part of the total final end groups, and the major portion of the individual polymer molecules in the cleaved product will then have active hydrogen end groups on both ends. The polymer being cleaved will preferably have a chain of at least about 100 of said monomer groups and more preferably at least about 500. The actual molecular weight of the polymer being cleaved and the number of cleavages per polymer molecule desired will, of course, depend on the purpose for which the final diol is to be used.

Because the poly(propylene glycol)s of this invention are polyethers having hydroxyl groups at each end of the polymer chain, they can then be used in various chain extension reactions. The chain extending agents can be any polyfunctional compound which reacts under appropriate temperature, pressure and catalyst with hydroxyl groups. They can be di- or polyisocyanate such as m- or p-phenylene diisocyanate, 2,4-toluene diisocyanate, 1,5-naphthyl diisocyanate, methylene di(p-phenyl diisocyanate), hexamethylene diisocyanate, triphenyl methane triisocyanate, etc.; di- or polyepoxides such as Epon resins, as for example, the diglycidyl ether of Bis Phenol-A, or di- or tri-aziridines as, for example, tris[1-(2-methyl) aziridinyl] phosphine oxide, tris(1-aziridinyl) phosphine oxide, or di- or polyanhydrides such as pyromellitic anhydride, or di- or polyimides such as phenylene bis-maleimide, etc. The difunctional chain extending agents are generally used in approximately stoichiometric amounts to the active chain ends when a linear, soluble high polymer product is desired. When the chain extending agent contains more than 2 functional groups and is used in approximately stoichiometric amounts to the active chain ends, the product is generally a cross-linked product. Alternatively, a cross-linked network can be obtained by using a combination of a difunctional active chain end polymer with low molecular weight similar poly-reactive compounds. Thus, the polyglycols of this invention, having hydroxyls on both ends of the polymer chain, on combination with a polyol such as glycerin, pentaerythritol, trimethylol propane, sorbitol, tetrakis (2-hydroxypropyl) ethylene diamine, or ethylene oxide or propylene oxide adducts of these polyols in combination with the diisocyanate will yield a cross-linked polyurethane network.

The new poly(propylene glycol)s of this invention can also be converted to useful polyester and polyamide block copolymers by the usual polyester and polyamide forming reactions, using either a simple monomeric unit such as the phthalic acids or esters, or using preformed polyesters or polyamides with appropriate reactive chain ends. Interfacial polymerization is advantageously used to prepare such materials by using acid chlorides of dicarboxylic acids or of carboxy ended polyesters or polyamides with the polyglycols. Alternatively, an amine ended polyamide can be reacted with the chloroformate ended diol (formed by the reaction of the polyglycol with phosgene) to give polyether-polyamide block copolymer joined by polyurethane links. The chloroformate ended glycol can also be reacted by interfacial polymerization with hydrazine or simple diamines to form polyurethane type products. The polyglycols can also be end-capped, by reaction with at least two moles of a di- or polyisocyanate, to give a product with reactive isocyanate end groups which can then be reacted with a diamine, such as hydrazine, ethylene diamine, phenylene diamine, etc., or an amine-ended polyamide, to give block-type copolymers containing urea links which are advantageous for increasing the softening point and improving the abrasion resistance of the polymer.

The crystalline poly(propylene glycol) of this invention is particularly useful in the preparation of polyurethane foams when used in combination with amorphous poly(propylene glycol) or amorphous propylene oxide adducts of various polyols and depending on the composition will be rigid, semi-rigid or elastomeric. This crystalline poly(propylene glycol) is also especially useful as a component in elastomeric foams because of the good low temperature properties and high strength on stretching of the foam so produced. The crystalline poly (propylene glycol) is useful in rigid and semi-rigid foams where it is the sole or major glycol component combined with a diisocyanate such as toluene diisocyanate or with a diisocyanate in combination with a small amount of a polyol such as trimethylol propane, glycerine, etc. Ordinary amorphous poly(propylene glycol) would not be useful in the preparation of rigid or semi-rigid foams unless it were combined with a very large amount of a polyol or polyisocyanate so as to give a high degree of cross-linking. In any event, the rigid foams from the crystalline poly(propylene glycol) are tougher and hence more useful at ordinary temperatures. The crystalline poly(propylene glycol) can also be used for the preparation of cast articles, for coatings, for binders as, for example, rocket propellants, and for elastomeric fibers, films, etc.

The crystalline poly(propylene glycol)s of this invention can be further modified to yield useful products. For example, they may be reacted in the presence of a base with other epoxides such as ethylene oxide, butene-1 oxide, etc. Such adducts may be just diadducts to convert the hydroxyl end groups to more reactive hydroxyethyl (ethylene oxide reaction) end groups. Such products because of their reactivity with isocyanate are especially useful for foam, particularly for the very useful one-shot foam processes. The adducts may consist of large blocks (5 to 100 units) of ethylene oxide, amorphous propylene oxide, amorphous butene-1 oxides, etc. Such block polymers containing the crystallizing diol units of this invention are unique and are unusually useful surface active agents, adhesives, and protective colloids. The ethylene oxide type are especially useful as unique detergents, dispersing agents, antistatic agents, dyeing aids, additives or coatings for fibers to prevent soil redeposition during laundering, etc.

The above products can be made directly following the cleavage reaction when conditions are such that the product formed contains largely metal alkoxide endgroups. The cleaved product can be concentrated, if desired, and reacted directly with the desired alkylene oxide under appropriate conditions of concentration, temperature and time, depending on the alkylene oxide and the product desired. The metal alkoxide end-group products from the cleavage reaction may also be used to make other useful block polymers by reaction with styrene, acrylates, methacrylates, acrylonitriles and acrylamides.

The poly(propylene glycol)s of this invention may be reacted with phosgene to give chloroformates which may be further reacted with diamines to form polyurethanes, with dialcohols to form polyesters or with sodium azide to give a reactive azide end-group.

The following examples illustrate the preparation of the crystalline poly(propylene glycol)s of this invention. All parts and percentages are by weight unless otherwise indicated. All examples were run under a nitrogen atmosphere. The molecular weight of the polymers is indicated by their reduced specific viscosities (RSV). By the term "reduced specific viscosity" is meant $\eta sp./C.$ determined on a 0.1% solution in chloroform at 25° C. unless otherwise indicated. The number average molecular weight (Mn) was determined in benzene (heating to dissolve the polymer when necessary) using a Mechrolab Vapor Pressure Osmometer. The calculated Mn was calculated from the hydroxyl analysis assuming 2 hydroxyls per chain. Hydroxyl analysis was determined by infrared and/or Zerewitinoff analysis. Where the melting point of the polymer is given, it was determined by differential thermal analysis (DTA) by the procedure described in Organic Analysis, vol. 4, pages 372–383, Interscience Publishers, New York, 1960.

*Example 1*

A crystalline (isotactic) poly(propylene oxide) stabilized with a small amount of phenyl-β-naphthylamine and having an RSV in benzene of greater than 3 and a melting point of 70° C., was used in this example. To a solution of 9.11 parts of this poly(propylene oxide) in 387 parts of anhydrous benzene was added with stirring at 30° C., 1.28 parts of lithium butyl in 7.2 parts of n-hexane. There was an immediate large drop in the viscosity of the solution. After stirring 15 minutes at 30° C., the reaction was stopped by adding 4 parts of anhydrous ethanol. The reaction mixture was washed twice with 125 ml. portions of a 10% aqueous solution of hydrogen chloride, then washed neutral with water, filtered, stripped of solvent, and dried. Seven and two-tenths (7.2) parts (79% yield) of a brown liquid when hot (80° C.) and a soft wax when cooled to room temperature resulted. It had an Mn of 3106. Infrared analysis showed 1.0% hydroxyl (Mn calculated of 3400) and no unsaturation. Ultraviolet showed 0.05% phenyl-β-naphthylamine in the final product. It was shown to be very highly crystalline by DTA and had a melting point of 62.5° C.

*Example 2*

Example 1 was repeated except that 3.75 parts of lithium butyl was added instead of 1.28 parts. The product was like that described in Example 1 except that it had an Mn of 1100.

*Example 3*

This example demonstrates the cleavage of the polymer in the polymerization reaction mixture without isolation of the polymer prior to the cleavage reaction.

Fifty (50) parts of propylene oxide was polymerized in 370 parts of anhydrous benzene using as the catalyst triethyl-aluminum which had been reacted with 0.5 mole of water, 0.04 mole of acetylacetone and 1.0 mole of methanol. This catalyst was prepared by diluting a 1.5 M solution of triethyl-aluminum in n-heptane with 3 moles of ether per mole of aluminum, cooling to 0° C. and slowly adding the specified amount of water, stirring for 1 hour at 0° C., slowly adding the specified amount of acetylacetone, stirring for 16 hours at room temperature, again cooling to 0° C., diluting with n-heptane to a 0.5 M solution, adding slowly the specified amount of methanol and agitating for 16 hours at 30° C. The polymerization reaction was carried out at 50° C. for 42 hours, adding half of the catalyst at the beginning and half after 19 hours, the total amount of catalyst amounting to 40 millimoles of aluminum. A total solids on a sample of the reaction mixture indicated a 90% conversion to polymer. The product was a mixture of atactic and isotactic poly(propylene oxide) having a molecular weight greater than 100,000.

The total reaction mixture was dissolved in 2420 parts of anhydrous benzene, and the solution was freed of unreacted monomer by distilling off, under reduced pressure 200 parts of the benzene. With the temperature at 30° C., 4.8 parts of lithium butyl in 30 parts of n-hexane was added. An immediate drop in viscosity of the solution occurred. After stirring for 0.5 hour at 30° C., the reaction was shortstopped by adding 20 parts of anhydrous ethanol. The reaction mixture was then stirred for 2 hours with one liter of a 10% aqueous solution of hydrogen chloride. The organic layer was separated, washed neutral with water, and 0.1% of phenyl-β-naphthylamine, based on the polymer, was added as stabilizer, after which the solvent was removed and the product dried. The total product which amounted to 43.5 g. (97% yield) was fractionated by dissolving it in 1720 parts of acetone and allowing crystallization to take place at −20° C. for 16 hours. The acetone-insoluble product was collected, washed twice with acetone at room temperature, then washed once with acetone containing 0.01% phenyl-β-naphthylamine, and then was dried. It amounted to 3.3 parts and was a hard wax having an RSV of 0.32 as measured in benzene at 25° C. and contained 0.25% phenyl-β-naphthylamine. It had an Mn of 8200 (corrected for phenyl-β-naphthylamine), was shown to be highly crystalline by DTA and had a melting point of 70° C. Infrared analysis indicated that it contained 0.3% hydroxyl (Mn calculated of 11,000) and no carbonyl or double bonds. The acetone-soluble polymer was recovered and dried. It was 37.2 parts of a viscous liquid when hot and a grainy liquid at room temperature. It had an RSV of 0.29 in benzene at 25° C. and an Mn of 3087. Infrared analysis showed that it contained 0.7% hydroxyl (Mn calculated of 4900) and no carbonyl or unsaturation.

The following examples illustrate the preparation of polyurethanes from the crystalline poly(propylene glycol)s of this invention.

*Example 4*

One part of the crystalline poly(propylene oxide) diol prepared in Example 1 was mixed under nitrogen with 3.5 parts of anhydrous benzene and 0.076 part of methylene di-p-phenyl diisocyanate (98% of the theoretrical amount based on an Mn of 3106). The mixture was heated at 120° C. for 6 hours, after which the solvent was removed by evaporation under nitrogen on a steam bath and the residue was dried for 16 hours at 80° C. under vacuum. The product so obtained amounted to 1.064 parts and was a tough solid.

Example 5

A mixture of 9.75 parts of crystalline poly(propylene glycol) having an Mn of 2000, prepared as described in Example 1 but doubling the quantity of butyllithium used, 87.8 parts of an amorphous liquid poly(propylene glycol) having an Mn of 2000 and 43.5 parts of tolylene diisocyanate (an 80:20 mixture of the 2,4 and 2,6-isomers) was heated at 80–120° C. for 1 hour to form a prepolymer containing excess diisocyanate. After cooling to room temperature, the viscous liquid prepolymer mixture was mixed with a blend of water (3.44 parts), triethylene diamine (0.48 part), stannous octoate (0.29 part) and silicone oil (0.96 part) for 5 seconds at 2400 r.p.m. The NCO to total hydroxyl ratio for the final foam was 1.05. The mixture was then poured into an open box and foamed, after which it was cured for 5 minutes at 105° C. The resultant foam was elastomeric and of low density (2.9 lbs. per cu. ft.), having an improved tensile strength over a similar foam made without the crystalline poly(propylene glycol).

Example 6

The procedure of Example 5 was repeated except that an 80:20 blend of the amorphous poly(propylene glycol) and crystalline poly(propylene glycol) was used. The foam so produced was of low density (2.9 lbs./cu. ft.) and while less elastomeric than that of Example 5 had improved tensile and tear strengths.

Example 7

A mixture of 101 parts of the poly(propylene glycol) used in Example 5 (Mn of 2000) and 45.6 parts of tolylene diisocyanate (80:20 mixture of 2,4 and 2,6 isomers) was heated for 2 hours at 120° C. to give a prepolymer. This prepolymer was then heated to 80° C. and a mixture of water (3.82 parts) and silicone oil (1.06 parts) was added, after which the whole was stirred at high speed, foaming occurring while hot. It was postcured for 10 minutes at 100° C. The foam so obtained was a tough, rigid, low density foam.

What I claim and desire to protect by Letters Patent is:

1. As a new composition of matter, a crystalline poly(propylene glycol) having a number average molecular weight of from about 1,000 to about 20,000 and exhibiting high crystallinity as shown by differential thermal analysis.

2. The product of claim 1 wherein the glycol has a number average molecular weight of from about 2,000 to about 10,000.

No references cited.

WILLIAM H. SHORT, *Primary Examiner.*

T. E. PERTILLA, *Assistant Examiner.*